United States Patent Office 3,330,873
Patented July 11, 1967

3,330,873
TRINUCLEAR PHENOL ANTIOXIDANTS
George William Godin and Hubert Charles Bailey, London, England, assignors to The Distillers Company Limited Edinburgh, Scotland, a British company
No Drawing. Filed Nov. 21, 1961, Ser. No. 154,051
Claims priority, application Great Britain, Dec. 2, 1960, 41,455/60, 41,456/60, 41,457/60
2 Claims. (Cl. 260—619)

The present invention relates to trinuclear phenols having antioxidant properties and to a method of production of such phenols.

According to the present invention a process for the production of a trinuclear phenol having the formula:

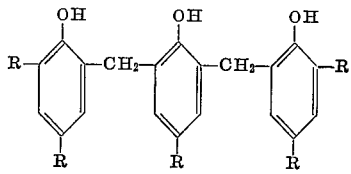

comprises condensing in the presence of a minor proportion of a substance providing divalent metal cations, a substituted phenol having the formula:

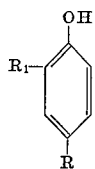

with a substituted hydroxymethyl phenol having the formula:

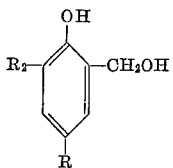

where R represents the same or different alkyl, cycloalkyl, aralkyl or alkoxy groups, $R_1$ represents an alkyl, cycloalkyl, aralkyl, alkoxy group or hydrogen atom, and $R_2$ represents an alkyl, cycloalkyl, aralkyl, alkoxy or methylol group and when $R_1$ is a hydrogen atom $R_2$ is an alkyl, cycloalkyl, aralkyl or alkoxy group, otherwise $R_2$ is a methylol group only. Novel compounds having the general formula:

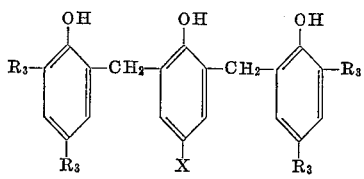

where $R_3$ represents the same or different alkyl, cycloalkyl or aralkyl groups and X represents an alkyl, aralkyl, or cycloalkyl group containing from 9 to 12 carbon atoms or an alkoxy group containing from 10 to 12 carbon atoms, are found to possess particularly good antioxidant properties. An especially useful series of compounds are those where the radical X is the cumyl radical, i.e.

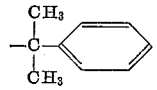

Examples of such compounds are 2:6-bis(2-hydroxy-3:5-dimethylbenzyl)-4-cumyl phenol and 2:6-bis(2-hydroxy-3-tert.butyl-5-methylbenzyl)-4-cumyl phenol.

The condensation process may be, for example, carried out in the presence of a minor proportion of a compound of manganese, zinc, cadmium, magnesium or cobalt which provides divalent metal cations or a mixture of such compounds. A preferred metal compound is zinc acetate. The proportion of substance employed is preferably a catalytic proportion, for example that sufficient to provide from 0.1% to 5% by weight of the cations based on the total weight of the phenols used.

The substituted hydroxymethyl phenol may be produced by reacting the corresponding phenol with formaldehyde. The reaction may be carried out in the presence of an alkaline condensing agent such as sodium hydroxide to produce the salt of the hydroxymethyl phenol, the phenol itself being then liberated by acidification with an acid such as acetic acid. It is however a particularly preferred embodiment of the invention to carry out this condensation of the phenol with formaldehyde consecutively followed by the condensation of the hydroxymethyl phenol with the substituted phenol in the same reactor employing the same catalytic substance or substances. This condensation therefore has the advantage that the consumption of at least one mole of alkali and of acid for each mole of trinuclear phenol produced is obviated.

The condensation reactions may be carried out in the presence of a solvent inert under the reaction conditions e.g. propylene glycol or benzene.

The trinuclear phenols of the invention have valuable antioxidant properties and may be incorporated as antioxidants in many different types of organic material susceptible to oxidative deterioration. They may, for instance, be incorporated in natural or synthetic rubbers, plastics, plasticizer esters, petroleum or other hydrocarbons, lubricants, greases, waxes or fats. The trinuclear phenols of the invention also form useful synergistic systems with other known antioxidants thus providing mixtures having greater antioxidant properties than any of the compounds of the mixture when used alone.

The invention is further illustrated by the following examples in which all parts quoted are parts by weight.

EXAMPLE 1

A mixture of 225 parts by weight of 2:4-xylenol, 154 parts of aqueous formaldehyde (containing 36% by weight formaldehyde), 5 parts of zinc acetate and 112 parts of the solvent propylene glycol was heated under reflux for 5 hours. 100 parts of p-cresol were then added and the mixture was heated under reflux for a further 3 hours. The reaction was then forced to completion by the removal of all water by distillation. The solvent and residual reactants were removed by steam distillation. The crude product when dry amounted to 327 parts, the theoretical yield based on p-cresol is 348 parts. The pure compound 2:6 - bis(2-hydroxy-3:5-dimethylbenzyl)-4-methylphenol, melting point 184.5° C. was obtained by recrystallising from hexane containing 5% ethanol.

EXAMPLE 2

A mixture of 100 parts by weight of p-cumyl phenol, 90 parts of aqueous formaldehyde (containing 36% by weight of formaldehyde), 5 parts of zinc acetate and 130 parts of propylene glycol was heated under reflux for 7 hours. 173 parts of 2:4-xylenol were added and the mixture was heated under reflux for a further 2 hours. Water was removed from the product by distillation and unreacted xylenol, together with the solvent propylene glycol, were removed by steam distillation. 207 parts of an amber coloured solid 2:6-bis(2-hydroxy-3:5-dimethylbenzyl)-4-cumylphenol were obtained; the theoretical yield of trinuclear phenol is 227 parts, based on p-cumyl phenol.

By recrystallising from hexane containing 1% ethanol a white product was obtained melting point 162° C.

*Analysis.*—Calculated for $C_{33}H_{36}O_3$: C, 82.46%; H, 7.55%. Found: C, 82.62%; H, 7.57%. Using this material as a reference substance the crude product was found by infra-red analysis to contain 90% of the desired trinuclear phenol, which was thus obtained in 82% yield based on p-cumyl phenol.

EXAMPLE 3

A mixture of 93 parts by weight of 2:4-xylenol, 64 parts of aqueous formaldehyde (containing 36% by weight of formaldehyde), 5 parts of zinc acetate and 125 parts of propylene glycol was heated under reflux for 7 hours. 100 parts of p-dodecylphenol (the $C_{12}$ constituent being of mixed composition) were then added and the mixture was heated under reflux for 3 hours. After the removal of water the product of 2:6-bis(2-hydroxy-3:5-dimethylbenzyl)-4-dodecylphenol was worked up as before to give 181 parts of product. The theoretical yield on p-dodecyl phenol is 202 parts.

The crude product was dissolved in hexane containing 2% by volume of ethanol and run through a column of alumina. With this solvent 70.3% of the material added to the column was recovered. On removal of the solvent a viscous product was obtained whose infra-red spectrum showed it to be a phenol with 1:2:3:5 tetra substitution round the benzene ring. No xylenol, dodecyl phenol, methylol compounds or the possible impurity 2:2'-methylene bis(4:6-dimethyl phenol) was detected, and the spectrum was consistent with that of the desired trinuclear phenol which was thus obtained in 63% yield.

EXAMPLE 4

A mixture of 100 parts by weight of p-cumyl phenol, 83 parts of aqueous formaldehyde (containing 36% by weight formaldehyde) 5 parts of zinc acetate and 100 parts of propylene glycol was heated under reflux for 7 hours. 170 parts of 2-butyl-4-methyl phenol were added and the mixture was heated under reflux for a further 2 hours. The product 2:6-bis(2-hydroxy-3-tert.butyl-5-methylbenzyl)-4-cumyl phenol was then worked up as in the previous example to yield 188 parts of an amber resin. The theoretical yield based on p-cumylphenol is 266 parts.

By recrystallising from hexane containing 1% ethanol a white product melting at 139° C. was obtained.

*Analysis.*—Calculated for $C_{39}H_{48}O_3$: C, 82.93%; H, 8.57%. Found: C, 82.64%; H, 8.57%.

EXAMPLE 5

A mixture of 100 parts of p-octylphenol i.e. 4-(1:1:3:3-tetramethylbutyl)phenol, 91 parts of aqueous formaldehyde (containing 36% by weight of formaldehyde), 5 parts of zinc acetate and 62 parts of propylene glycol was heated under reflux for 2 hours. 88 parts of 2:4-xylenol were added and the mixture was heated under reflux for a further 2 hours. The mixture was treated as before to yield 207 parts of crude solid product 2:6-bis(2-hydroxy-3:5-dimethylbenzyl)-4-octylphenol. The theoretical yield on 2:4-xylenol which in this preparation was the minor phenolic component, is 170 parts.

By recrystallising from hexane a white product melting point 159° C. was obtained.

*Analysis.*—Calculated for $C_{32}H_{42}O_3$: C, 80.97%; H, 8.92%. Found: C, 81.15%; H, 8.97%. Using this material as a reference substance the crude product was found to contain 70% of the desired trinuclear phenol, which was thus obtained in 85% yield based on 2:4-xylenol.

EXAMPLE 6

A sample of a linear polyethylene was washed with ethanol to remove stabilising compounds present. Portions of this material were then slurried in a solution of an antioxidant in ethanol to produce, in each case, a mixture of polyethylene containing 0.05% by weight of antioxidant. The compounds used were the novel 2:6-bis(2-hydroxy-3:5 - dimethylbenzyl)-4-cumylphenol and the known antioxidants 2:6-di - tert.butyl-4-methylphenol and 2:2'-methylene bis(4 - methyl-6-α-methylcyclohexylphenol).

The ethanol was then removed by evaporating at 40° C. in a vacuum oven and the polyethylene samples were pressed into films of 0.01 inch thickness. The films were then heated at 150° C. in the presence of molecular oxygen and the induction periods measured; these are given in the table.

*Table 1*

| Antioxidant: | Induction period (hours) |
|---|---|
| 2:6 - bis(2 - hydroxy-3:5 - dimethylbenzyl)-4-cumylphenol | 63.6 |
| 2:6-di-tert.butyl-4-methylphenol | 6.5 |
| 2:2'-methylene bis(4-methyl-6 - α-methylcyclohexylphenol) | 34.5 |

EXAMPLE 7

Samples of the plasticiser di-(2-ethylhexyl)phthalate containing 0.01% by weight of one of the new trinuclear phenolic antioxidants or of the known antioxidant 2:6-di-tert.butyl-4-methyl phenol were shaken with molecular oxygen at 160° C. The induction periods observed are given in Table 2. In the absence of antioxidant the phthalate oxidised immediately.

*Table 2*

| Antioxidant: | Induction period (hours) |
|---|---|
| 2:6-bis(2-hydroxy-3:5-dimethylbenzyl) - 4-dodecyl phenol | 15.2 |
| 2:6-bis(2-hydroxy-3-tert.butyl-5-methylbenzyl)-4-cumyl phenol | 12.4 |
| 2:6-di-tert.butyl-4-methylphenol | 4.8 |

EXAMPLE 8

The ability of the new trinuclear phenolic antioxidants to form useful synergistic systems with other antioxidants is illustrated in Table 3, which shows the induction periods obtained at 160° C. with antioxidants in di(2-ethylhexyl)phthalate. In each case the induction periods observed with two component mixtures were substantially greater than the sum of the induction periods of the separate components.

*Table 3*

| Antioxidant: | Induction period (hours) |
|---|---|
| 0.01% by wt. 2:6-bis(2-hydroxy-3:5-dimethylbenzyl)4-cumyl phenol | 22.6 |
| 0.01% by wt. zinc pentamethylene dithio carbamate | 1.4 |
| 0.01% by wt. di-lauryl-thiodipropionate | 0.3 |
| 0.01% by wt. di-isopropyl phosphite | 0.2 |
| 0.01% 2:6-bis(2-hydroxy-3:5-dimethylbenzyl)-4-cumyl phenol +0.01% zinc pentamethylene | |

| | |
|---|---|
| di-thio carbamate | 30.9 |
| 0.01% 2:6-bis(2-hydroxy-3:5-dimethylbenzyl)-4-cumyl phenyl +0.01% dilauryl thiodipropionate | 32.8 |
| 0.01% 2:6-bis(2-hydroxy-3:5-dimethylbenzyl)-4-cumyl phenol +0.01% diisopropyl phosphite | 41.1 |

We claim:
1. The trinuclear phenol 2:6-bis(2-hydroxy-3:5-dimethyl-benzyl)-4-cumyl phenol.
2. The trinuclear phenol 2:6-bis(2-hydroxy-3-tert.butyl-5-methylbenzyl)-4-cumyl phenol.

References Cited

UNITED STATES PATENTS

| | | | |
|---|---|---|---|
| 2,543,489 | 2/1951 | De Groote et al. | 260—619 |
| 2,744,882 | 5/1956 | Bender et al. | 260—619 |
| 2,754,335 | 7/1956 | Bender et al. | 260—619 |
| 2,905,737 | 9/1959 | Webb | 260—619 X |

LEON ZITVER, *Primary Examiner.*

CHARLES B. PARKER, *Examiner.*

D. R. MAHANAND, H. G. MOORE, D. M. HELFER, H. ROBERTS, *Assistant Examiners.*